J. P. STANZA.
COLTIVATOR SHOVEL.
APPLICATION FILED NOV. 5, 1908.

976,518.

Patented Nov. 22, 1910.

Witnesses

Inventor
J. P. Stanza
By
Attorneys

UNITED STATES PATENT OFFICE.

JOHN P. STANZA, OF EATON, OHIO.

CULTIVATOR-SHOVEL.

976,518.                Specification of Letters Patent.      Patented Nov. 22, 1910.

Application filed November 5, 1908.   Serial No. 461,163.

*To all whom it may concern:*

Be it known that I, JOHN P. STANZA, a citizen of the United States, residing at Eaton, in the county of Preble and State of Ohio, have invented certain new and useful Improvements in Cultivator - Shovels, of which the following is a specification.

This invention provides an implement particularly designed for cultivating tobacco, cotton or other crops necessitating frequent cultivation to prevent the growth of weeds and to thoroughly loosen the soil so that the roots may penetrate the same and derive nourishment to produce a stocky and vigorous plant.

The invention provides a shovel which may be used in connection with a standard or plow of any make or description and which in operation will cut under the soil in a way to thoroughly eradicate weeds and like objectionable growths and at the same time loosen and pulverize the soil.

While the invention may be adapted to different forms and conditions by changes in the structure and minor details without departing from the spirit or essential features thereof, still the preferred embodiment of the invention is shown in the accompanying drawings.

Figure 1:
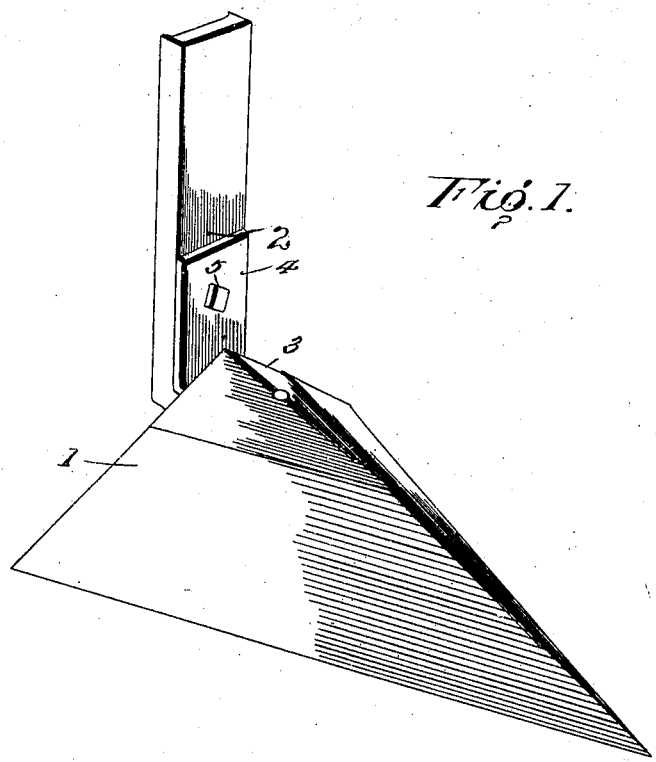
Figures 2, 3:
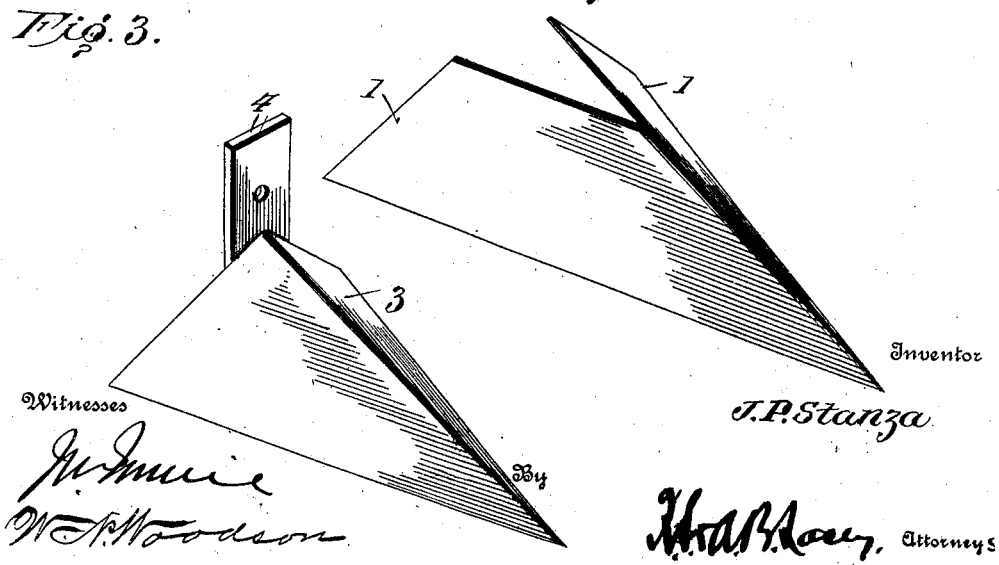

For a full understanding of the invention and the merits thereof and also to acquire a knowledge of the details of construction, of the means for effecting the result, reference is to be had to the following description and accompanying drawings, in which:

Figure 1 is a perspective view of a cultivator shovel embodying the invention. Fig. 2 is a perspective view of the shovel blade. Fig. 3 is a detail view of the foot to which the shovel blade is adapted to be fitted.

Corresponding and like parts are referred to in the following description and indicated in all the views of the drawings by the same reference characters.

In the practical embodiment of the invention the shovel blade comprises two wings 1 which are oppositely inclined from a medial line, the inclination being rearwardly, downwardly and outwardly. The shovel blade may be cast or may be formed of plate steel cut into an approximately V-form and bent on a medial line to cause the two wings to similarly incline, substantially as herein set forth and as indicated in the drawings.

Detachably secured to the lower end of the standard 2, as by a bolt 5, is a shank 4 having a laterally extending cap piece 3, the upper surface of which is inclined downwardly in opposite directions and to which is attached the shovel blade, in any substantial way. The upper edge of the shovel blade preferably overlaps and bears against the inclined exterior wall of the cap piece 3. By such a construction, shovel blades of different sizes may be supported on said cap piece. In practice, any number of shovel blades may be employed and secured to a framework, the arrangement being such as to have the shovel blades slightly overlap to insure a thorough cultivation and removal of weeds and like growths.

Having thus described the invention, what is claimed as new is:

The combination with a standard, of a shank detachably secured to the lower end of the standard and provided with a substantially triangular laterally extending cap piece, the upper surface of which is inclined downwardly in opposite directions, and a shovel blade open at its rear end and provided with oppositely inclined wings overlapping the inclined side walls of the cap piece and having their rear edges disposed flush with the rear edges of said cap piece, the cap piece being constructed to coöperate with shovel blades of various sizes.

In testimony whereof I affix my signature in presence of two witnesses.

JOHN P. STANZA. [L. S.]

Witnesses:
P. A. GALE,
E. E. BAILEY.